United States Patent
Pothukuchi et al.

(10) Patent No.: US 9,141,928 B2
(45) Date of Patent: Sep. 22, 2015

(54) SYSTEM AND METHOD FOR VENDOR AND CUSTOMER MANAGEMENT IN A SUPPLY CHAIN

(75) Inventors: Hari Pothukuchi, Alpharetta, GA (US); Noni Gonzalez, Alpharetta, GA (US); Ernesto Solera, Cumming, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 794 days.

(21) Appl. No.: 12/848,306

(22) Filed: Aug. 2, 2010

(65) Prior Publication Data

US 2012/0030067 A1 Feb. 2, 2012

(51) Int. Cl.
G06Q 10/08 (2012.01)
G06Q 30/06 (2012.01)

(52) U.S. Cl.
CPC .............. *G06Q 10/08* (2013.01); *G06Q 10/087* (2013.01); *G06Q 30/0635* (2013.01)

(58) Field of Classification Search
USPC .......................................... 705/26, 27, 28, 7
See application file for complete search history.

(56) References Cited

U.S. PATENT DOCUMENTS

| | | | |
|---|---|---|---|
| 6,846,684 B1 | 1/2005 | Yazback et al. | |
| 6,981,222 B2 | 12/2005 | Rush et al. | |
| 7,006,988 B2 | 2/2006 | Lin et al. | |
| 7,197,741 B1 | 3/2007 | Stapf | |
| 7,343,345 B1 | 3/2008 | Yeh et al. | |
| 7,499,871 B1 | 3/2009 | McBrayer et al. | |
| 7,533,050 B2 | 5/2009 | Shamrakov | |
| 7,590,987 B2 | 9/2009 | Behrendt et al. | |
| 7,870,012 B2 * | 1/2011 | Katz et al. | 705/7.26 |
| 2002/0042756 A1 * | 4/2002 | Kumar et al. | 705/26 |
| 2002/0099578 A1 * | 7/2002 | Eicher et al. | 705/7 |
| 2006/0009991 A1 * | 1/2006 | Jeng et al. | 705/1 |
| 2009/0287518 A1 | 11/2009 | Marode et al. | |

OTHER PUBLICATIONS

Kapoor et al.; "Sense-and-respond supply chain using model-driven techniques," IBM System Journal, v46n4pgs685-702; PQDialog #222425641, 19pgs.*

* cited by examiner

*Primary Examiner* — Rob Pond
(74) *Attorney, Agent, or Firm* — Akerman LLP; Michael K. Dixon; Roy P. Zachariah

(57) ABSTRACT

A method of managing a supply chain comprises providing at a customer interface module a plurality of order fulfillment options to a customer, and receiving from the customer a selection of a particular order fulfillment option. The method also includes receiving a first order from the customer, and receiving a first inventory status from a first distribution center. A first distribution center sends a first product to the customer in response to determining that the particular order fulfillment option comprises a fill-partial order fulfillment option, and a duration between the time that the first product is directed to be sent and the time when the first product is actually sent is determined. An alert is generated if the duration is greater than a predetermined duration.

20 Claims, 5 Drawing Sheets

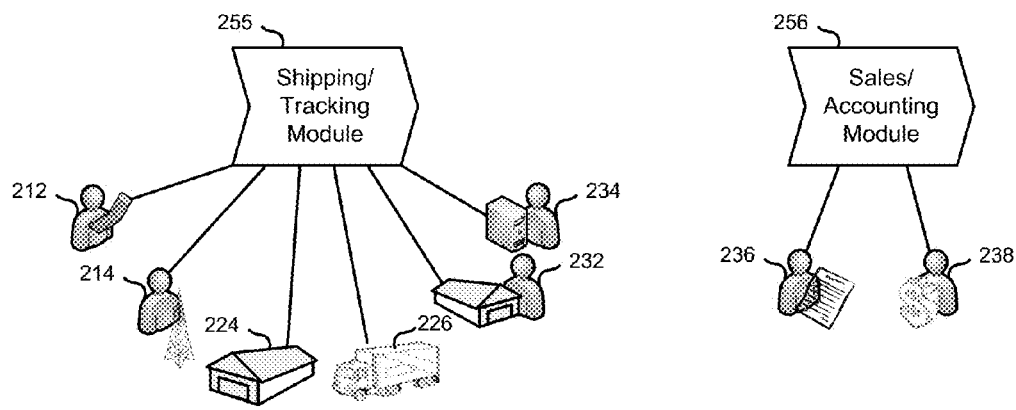
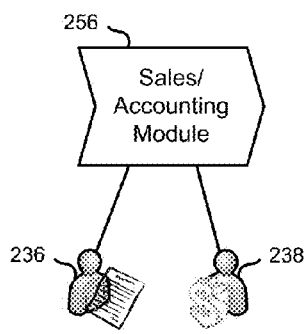
*FIG. 8*  *FIG. 9*
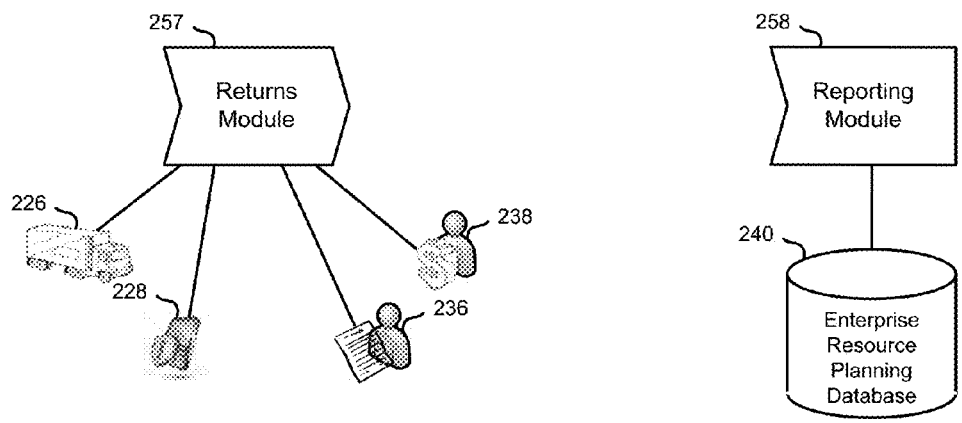
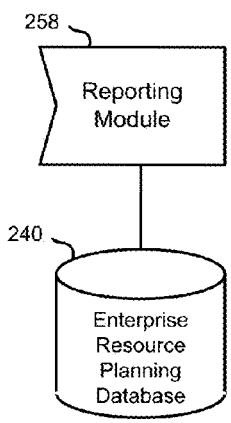
*FIG. 10*  *FIG. 11*

SYSTEM AND METHOD FOR VENDOR AND CUSTOMER MANAGEMENT IN A SUPPLY CHAIN

FIELD OF THE DISCLOSURE

The present disclosure generally relates to a supply chain system, and more particularly relates to vendor and customer management in a supply chain system.

BACKGROUND

A provider of products and services uses a supply chain to deliver the products and services to their customers. For example, a mobile communication network service provider builds and maintains the network, including one or more base station subsystems, a network switching subsystem, and a core network subsystem. The service provider manages a supply chain that includes products and suppliers to build and maintain the mobile communication network, and products and suppliers of the mobile devices that the subscribers use to access the network. Thus the supply chain for a mobile communication network includes a wide variety of products and services, distributed over a wide geographic area, and distributed through a large number of outlets including warehouses, retail stores, Internet-based electronic commerce sites, and others.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIGS. 4 through 12 are block diagrams illustrating an embodiment of the modules in the supply chain management system of FIG. 3

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
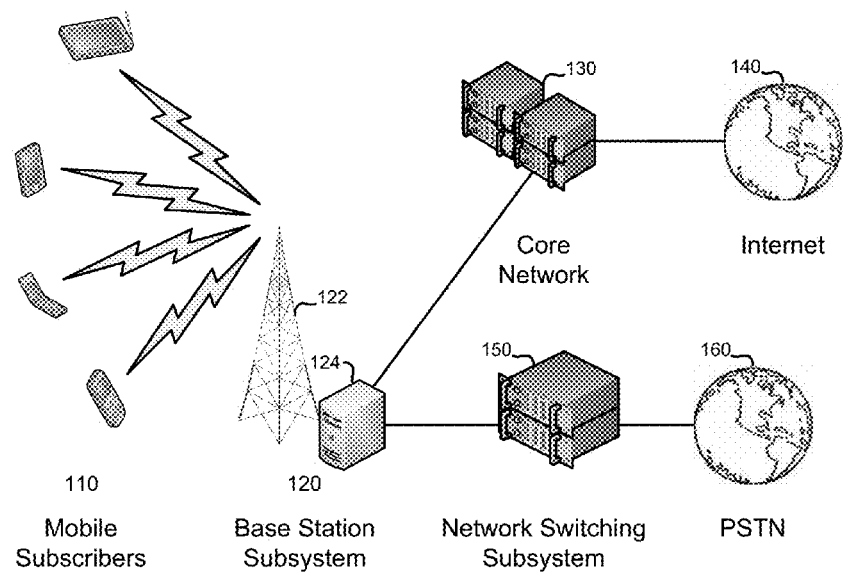
FIG. 1 is a block diagram illustrating an embodiment of a mobile communication network.

FIG. 1 illustrates an embodiment of a mobile communication network 100 including mobile subscribers 110, one or more base station subsystems 120, a core network 130, and a network switching subsystem 150. Mobile subscribers 110 use various mobile devices to connect to mobile communication network 100 through base station subsystem 120. The operator of mobile communication network 100 uses a particular mobile communications standard for implementing the network, such that mobile devices that comply with the standard are able to communicate with the network. A non-limiting example of a mobile communications standard includes General Packet Radio Service (GPRS), Global System for Mobile Communications (GSM), Code Division Multiple Access (CDMA), another mobile communications standard, or a combination thereof. A non-limiting example of a mobile device includes a tablet computer, a personal data assistant, a cellular telephone, an Internet enabled smart phone, another mobile device, or a combination thereof.

Base station subsystem 120 includes a base transceiver station 122 and a base station controller 124. Base transceiver station 122 includes equipment that complies with the mobile communication standard for transmitting to and receiving radio signals from the mobile devices, antennas and antenna towers, encryption equipment, other equipment, or a combination thereof. One or more base transceiver stations 122 is controlled by base station controller 124, which operates to handle radio channel allocation, power level control, and handovers of mobile devices when they pass from one base transceiver station to another. Base station controller 124 also operates as a concentrator to combine the low utilization communication traffic from the multiple base transceiver stations 122 into a smaller number of higher utilization communication channels to core network 130 and to network switching subsystem 150.

Core network 130 operates to interface between the elements of mobile communication network 100 and an external network 140, such as the Internet. As such, core network 130 appears as a sub-network to external network 140, and data targeted to mobile subscribers 110 is routed to the correct base station subsystem 120 to provide the data to the correct mobile device. Network switching subsystem 150 provides phone call switching functionality to mobile communication network 100, and mobile device management for roaming services in the network. Network switching subsystem 150 also provides access to a public switched telephone network (PSTN) for cellular telephone functionality on mobile communication network 100.

In order to establish, maintain, and operate mobile communication network 100, the operator of the network manages a supply chain for the timely delivery of the devices and services. In particular, a portion of the supply chain is dedicated to network services, and is focused on the devices and equipment used to build the infrastructure of mobile communication network 100, tracking of inventory, and providing spares for maintenance and operation of the network. A non-limiting example of network service devices and equipment includes communication towers, base station equipment, base station controller equipment, core network equipment, network switching equipment, other equipment, or a combination thereof. Another portion of the supply chain is dedicated to retail devices and services, and is focused on the devices and equipment used by mobile subscribers 110. A non-limiting example of retail devices and services includes mobile devices, mobile device accessories such as headsets, power supplies, customization products, or the like, warranty and return services, other retail devices and services, or a combination thereof. The supply chain can also be characterized in terms of the delivery channels. For example, retail devices and services can be delivered through various business-to-business enterprises, service agents, retail outlets, web based enterprises, other channels, or a combination thereof. Note that mobile communication network 100 is used as an illustrative example of a system that has a related supply chain. Other non-limiting example of systems that have related supply chains include an Internet protocol television (IPTV) network, a consumer goods and retail supply network, a pharmaceutical and medical supply network, an automotive parts and repair network, another system where a supply chain is managed, or a combination thereof.

Figure 2:
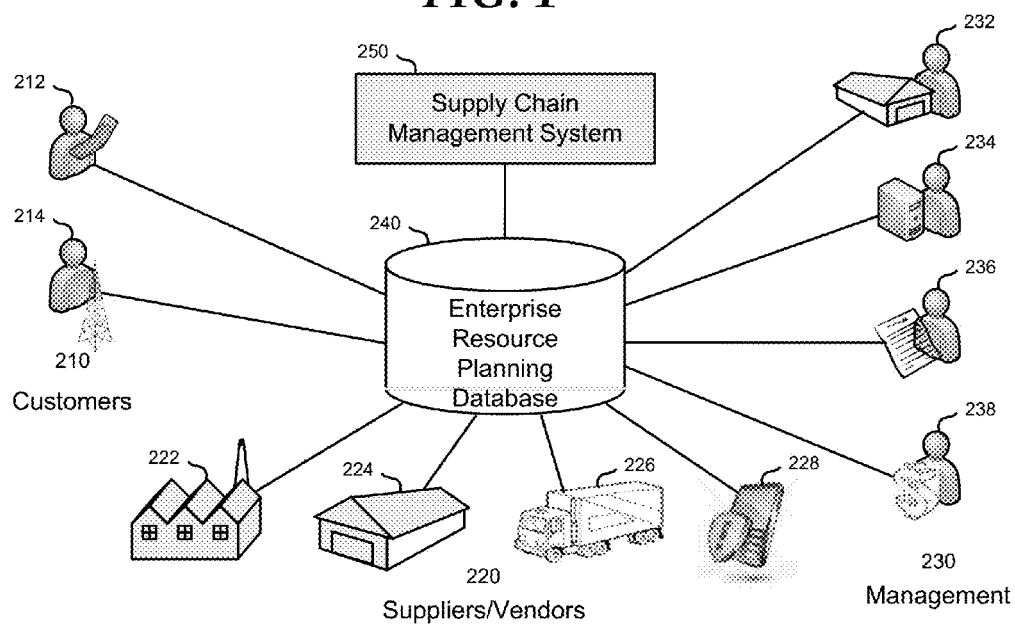
FIG. 2 is a block diagram illustrating an embodiment of a supply chain system for the mobile communication network of FIG. 1.

FIG. 2 illustrates a supply chain system 200, such as for mobile communication network 100. Supply chain system 200 includes customers 210, suppliers/vendors 220, management services 230, an enterprise resource planning (ERP) database 240, and a supply chain management system 250. End customers 210, suppliers/vendors 220, management services 230, and supply chain management system 250 are connected to enterprise resource planning database 240. Customers 210 include retail customers 212 and network customers 214. Retail customers 212 represent mobile subscribers 110 who opt to obtain their mobile devices from the operator of mobile communication network 100, as opposed to those mobile subscribers who obtain their mobile devices from other sources. Retail customers 212 also represent the various channels whereby the operator makes the mobile devices available to mobile subscribers 100. Network customers 214 include personnel associated with the operator who are engaged in building and maintaining the network. In a particular embodiment, customers 210 include other types of customers, such as retail customers that are not mobile subscribers 110, but who obtain their mobile devices from the operator for use on another mobile communication network (not illustrated).

Suppliers/vendors 220 include manufacturers 222, distribution centers 224, delivery services 226, and warranty/return services 228. Manufacturers 222 include the makers, builders, and system integrators that the operator of mobile communication network 100 rely on to build and maintain the network, and to supply the mobile devices available to customers 210. Manufacturers 222 also include outlets utilized by the operator to obtain devices and equipment for the network and for mobile subscribers. Distribution centers 224 include warehousing and regional storage areas for devices and equipment. Delivery services 226 include shippers and transport services used by the operator to deliver devices and equipment to customers 210. In a particular embodiment, suppliers/vendors 220 include other types of product or service suppliers, such as construction companies contracted to construct buildings and antenna towers to house base station subsystem 120, repair facilities to support warranty/repair services 228, or other types of product or service providers. Generally, suppliers/vendors 220 do not include product or service providers over which the operator has no level of control or input.

Management services 230 include distribution management 232, network management 234, contract management 236, and account management 238. Distribution management 232 includes functions within the operator of mobile communication network 100 for ensuring that products and services are readily available to customers 210 in a timely fashion and for receiving and tracking orders for products and services. Network management 234 includes functions similar to distribution management 232, but with an emphasis on the buildout and maintenance of the network. Contract management 236 includes functions for establishing agreements with customers 210 and suppliers/vendors 220, and for monitoring compliance with the agreements. Accounting management 238 includes functions for tracking inventory status and financial transactions related to the delivery of the products and services.

ERP database 240 is a system for managing the information flow between customers 210, suppliers/vendors 220, and management 230, that integrates information from the different sources and in different formats into a commonly accessed database. Supply chain management system 250 is a system for defining, creating, and maintaining the operating rules governing supply chain system 200. Thus, supply chain management system 250 uses the information included in ERP database 240 to manage the interactions between customers 210, suppliers/vendors 220, and management 230 in the various stages of the supply chain.

Figure 3:
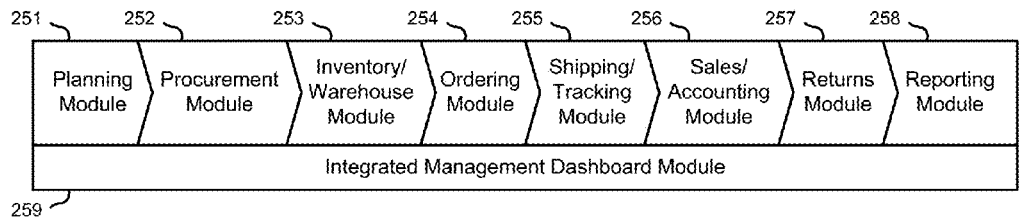
FIG. 3 is a block diagram illustrating an embodiment of a supply chain management system of FIG. 2.

FIG. 3 illustrates an embodiment of supply chain management system 250, including a planning module 251, a procurement module 252, an inventory/warehouse module 253, an ordering module 254, a shipping/tracking module 255, a sales/accounting module 256, a returns module 257, a reporting module 258, and an integrated management dashboard (IMDM) module 259. FIGS. 4-12 illustrate embodiments of the elements of supply chain management system 250. The customers 210, vendors/suppliers 220, and management services 230 that are illustrated as being connected to the elements of supply chain management system 250 are not to be construed as exclusive, but are illustrative of the functions of the element shown therein. Other customers 210, vendors/suppliers 220, management services 230, or a combination thereof can be connected to the elements of supply chain management system 250, as needed or desired.

Figure 4:
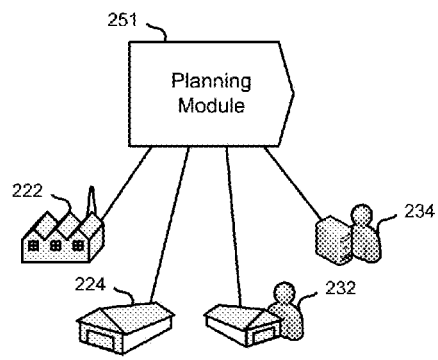

FIG. 4 illustrates an embodiment of planning module 251. Planning module 251 manages information from manufacturers 222, distribution centers 224, distribution management 232, and network management 234. Planning module 251 operates to determine the demand for products and services and recommend inventory levels for supplies of the products and services. Planning module 251 analyzes various demands for products and services and consolidates delivery, warehousing, and allocation of the products and services. In addition, planning module 251 makes purchase recommendations including what to buy, when, and quantity, and automatically converts the recommendations into purchase orders. Planning module 251 analyzes inventory to determine substitutes to avoid bottlenecks, and automatically substitutes old inventory before kitting with new products to use up the old inventory. Planning module 251 also analyzes constraints in manufacturers 222 and in distribution centers 224 to predict and avoid potential bottlenecks. Performance to service level agreements (SLAs) is also monitored, and alerts are provided when SLAs are not being met, or when potential shortages or other issues are identified.

Figure 5:
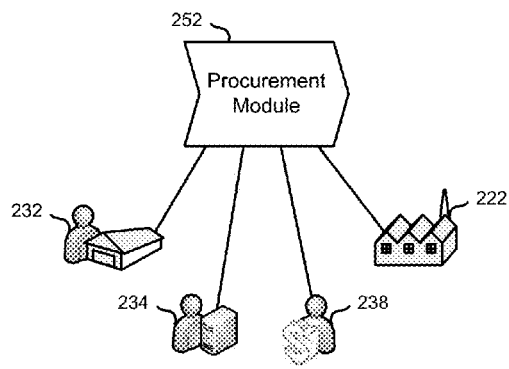

FIG. 5 illustrates an embodiment of procurement module 252. Procurement module 252 manages information from manufacturers 222, distribution management 232, network management 234, and account management 238. Procurement module 252 operates to buy products and services, create consolidated purchase orders, and validate the accounting of the purchase orders. Also, procurement module 252 carries out auctions to sell products and services and to sell unwanted or excess inventory, and carries out reverse auctions to purchase products and services from multiple suppliers. Procurement module 252 also tracks contract based purchasing where routine or scheduled procurement is established. Procurement module 252 provides access to suppliers/vendors 220 to view bills and invoices.

Figure 6:
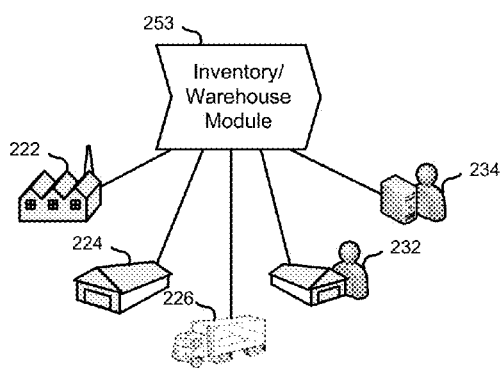

FIG. 6 illustrates an embodiment of inventory/warehouse module 253. Inventory/warehouse module 253 manages information from manufacturers 222, distribution centers 224, delivery services 226, distribution management 232, and network management 234. Inventory/warehouse module 253 operates to track all of the products and services that are bought and sold in supply chain system 200, including the prices paid and the particular supplier/vendor 220 that provided the products and services, and to monitor inventory levels. Inventory/warehouse module 253 also operates to create and manage which products and services are stored at which distribution centers 224 or are offered at by which channels. Also, inventory/warehouse module 253 manages and tracks serialized products for auditing account management purposes.

Figure 7:
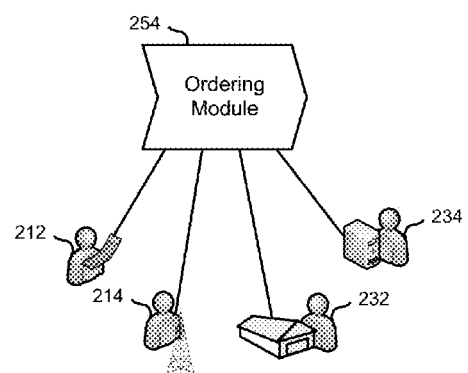

FIG. 7 illustrates an embodiment of ordering module 254. Ordering module 254 manages information from retail customers 212, network customers 214, distribution management 232, and network management 234. Ordering module 254 operates to receive orders from customers 210 and automatically generated orders from procurement module 252, prioritize the orders, and determine a route or channel from which to fill the order, for example by filling an order from a warehouse that is proximate to the ordering point, or from a different warehouse that is proximate to the delivery point. Ordering module 254 also operates to track ongoing orders and make changes to the routes and channels for the orders based upon the real time situation. In a particular embodiment, ordering module 254 provides a web based order tracker so that customers 210 can obtain up to date order status.

FIG. 8 illustrates an embodiment of shipping/tracking module 255. Shipping/tracking module 255 manages information from retail customers 212, network customers 214, manufacturers 222, distribution centers 224, delivery services 226, distribution management 232, and network management 234. Shipping/tracking module 255 operates to track the movement of the products moved by delivery services 226 to customers 210, and includes a web based shipping tracker so that customers can obtain up to date shipping status.

FIG. 9 illustrates an embodiment of sales/accounting module 256. Sales/accounting module 256 manages information from contract management 236 and account management 238. Sales/accounting module 256 operates to receive orders for products and services, provide invoices for the orders, and to ensure compliance with contract terms and agreements. In a particular embodiment, sales/accounting module 256 also integrates with an account management system maintained by the operator of mobile communication network 100.

FIG. 10 illustrates an embodiment of Returns module 257. Returns module 257 manages information from delivery services 226, warranty/return services 228, contract management 236, and account management 238. Returns module 257 operates to process equipment returns for exchanges or warranty repair operations, to track the origin location of the return to determine a proximate return processing center, and to track serial numbers on equipment for fraud prevention. Returns module 257 also operates with sales/accounting module 256 to credit accounts were needed or desired. Also, returns module 257 operates to alert inventory/warehouse module 253 of returns in order to adjust inventory levels.

FIG. 11 illustrates an embodiment of reporting module 258. Reporting module 258 is shown as connected to ERP database 240 indicating that the reporting module manages information from retail customers 212, network customers 214, manufacturers 222, distribution centers 224, delivery services 226, warranty/return services 228, distribution management 232, network management 234, contract management 236, and account management 238. Reporting module 258 operates to provide status, trending, and forecast reports on all parts of supply chain system 200. In particular, reporting module 258 provides profitability reports, SLA tracking reports, vendor analysis reports, channel utilization reports, inventory and peak demand reports, product mix analysis reports, and other reports as needed or desired.

Figure 12:
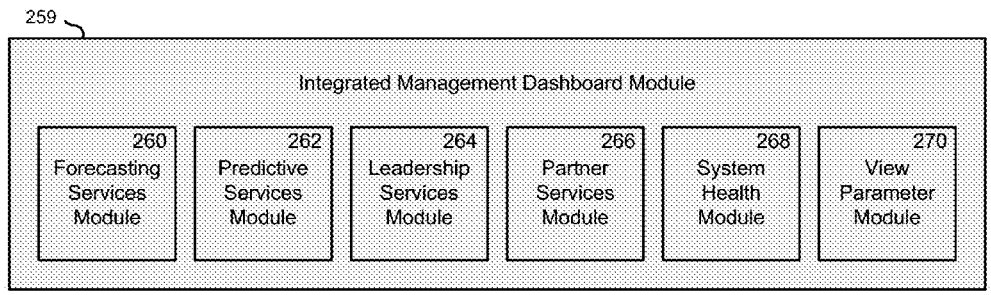

FIG. 12 illustrates an embodiment of integrated management dashboard module 259 including a forecasting services module 260, a predictive services module 262, a leadership services module 264, a partner services module 266, a system health module 268, and a view parameter module 270. Integrated management dashboard module 259 provides an interface between the users associated with customers 210, suppliers/vendors 220, and management 230, to view the activities within supply chain system 200. In a particular embodiment, integrated management dashboard module 259 provides text based updates and alerts using a messaging or e-mail format. In another embodiment, integrated management dashboard module 259 provides a graphical user interface to obtain updates and alerts. The information contained in the updates and alerts are customizable by the users, as is the look and feel of the interface to integrated management dashboard module 259.

In addition to real time snapshots of supply chain system 200, integrated management dashboard module 259 provides prospective alerts based upon forecasted needs or predicted events. Thus, forecasting services module 260 operates to indicate options to redirect activities in the supply chain to meet expected demand. For example, if a particular item is expected to be a high demand item, forecasting services module 260 provides selectable options to redirect inventory in supply chain system 200 to meet the expected demand. The expected demand can be characterized in terms of a usage rate at which a particular inventory item is ordered. Depending on the type of inventory, the usage rate can be used to make short term forecasts, such as the expected demand in the one to two week timeframe, or can be used to make longer term forecasts, such as for the one to three month timeframe. For example, if the inventory item is a popular new cell phone, a short term forecast will assist the channels in planning their own inventory levels and incentive programs. If the inventory item is an element of a base transceiver station, then a long term forecast can be a suitable forecast for the usage rate. Forecasts can be based on a particular product, on a particular category of products, or on a combination of products, or based on a regional usage.

Forecasting services module 260 also provides options to determine whether to replenish inventory or to replace with updated items, to move aging inventory or to auction and replace, and to use available substitutes for orders for unavailable products. Forecasting module 260 also provides a fill-or-kill feature that permits customers to predetermine order fulfillment options that define rules for how to handle an order when not all products ordered are available. For example, a customer determine in advance whether to use a particular substitute to fill an order, to fill only the available portion of the order, to kill the order, or to delay the order until all products are available.

Predictive services module 262 operates to allow for longer term forecasting of conditions in supply chain system 200. Thus, for example, predictive services module 262 receives customer activation information and usage analysis information to make predictions as to the future capacity needs of mobile communication network 100, and forecasts long term shortages of equipment and services. Predictive services module 262 also uses the customer activation information to track customer usage and for fraud detection. For example, when a mobile device is activated on mobile communication network 100, predictive services module 262 can verify that the mobile device is authorized to access the mobile communication network, and can detect stolen or hacked subscriber identity module (SIM) card, place a hold on the account, and alert authorities. Also, predictive services module 262 tracks order promise dates and monitors performance to order promise dates to identify potential bottlenecks or underperforming channels or suppliers. Predictive services module 262 also performs order volume analysis which permits bulk volume customers such as big box retailers to analyze and plan their operations.

Leadership services module 264 operates to monitor SLAs with suppliers/vendors 220 and with stakeholders within supply chain system 200. For example, a distribution center 224 can have an SLA to ship all orders with 24 hours of the receipt of the order, or a data service provider can have an SLA to provide 97% service up time. Thus leadership services module 264 can track trends in performance to SLAs and create reports related to the performance to the SLAs.

Partner services module 266 operates to provide self service interfaces to customers 210, suppliers/vendors 220, and management services 230 to view performance metrics and to aid channel partners with their inventory planning. System health module 268 operates to provide real time end-to-end system visibility, including notifications and alerts on transaction errors, root causes, and correction tracking. View parameter module 270 operates to provide knobs whereby stakeholders can adjust the view parameters and notification parameters of their accounts.

Figure 13:
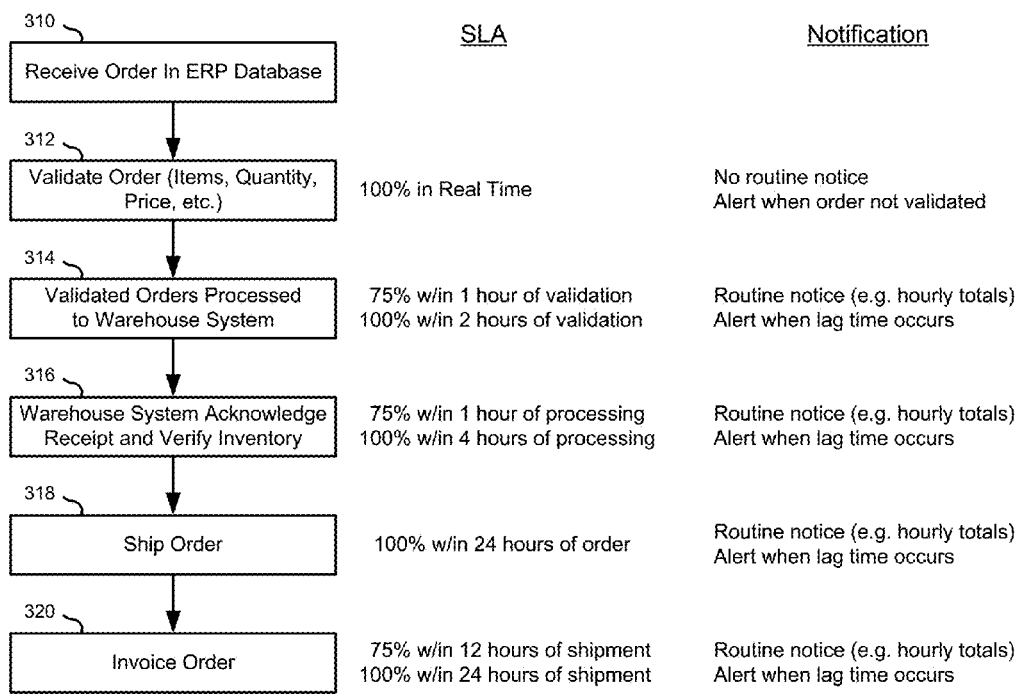
FIG. 13 is a flowchart illustrating an embodiment of a method of order fulfillment in the supply chain system of FIG. 2.

FIG. 13 is a flowchart illustrating an embodiment of a method of order fulfillment in supply chain system 200. In the illustrated embodiment, the steps of the method are associated with SLAs that define the success criteria for the associated steps, and notification procedures associated with the SLAs that define how to handle successful or failing performance to the associated SLAs. The illustrated SLAs and notification procedures are given as non-limiting examples of SLAs and notification procedures associated with an order fulfillment method. Other SLAs and notification procedures can be defined as needed or desired. The method begins in block 310 where orders are received. In a particular embodiment, the orders are received from customers 210 by ERP database 240. The orders include quantities of one or more line items, each line item representing a particular product or service available through supply chain system 200, and a unit price for each line item. For example, a retail customer may order a particular mobile device, an associated power cord, and a carrying case, or a retail store may order several each of multiple mobile devices and an assortment of associated power cords, cases, and other accessories in order to maintain inventory levels sufficient to meet the expected demand. Integrated management dashboard module 259 provides users of supply chain system 200 with information related to the orders received in block 310.

Table 1 illustrates an example of an order summary provided by integrated management dashboard module 259 for orders received by ERP database 240 in block 310. The dates of the orders are provided in the first column. Here, a two day window is viewed for the purpose of tracking to a 24 hour shipping SLA, described below. In this example, orders are received from various channels including retail outlets, internet sales, and product returns, as shown in the second column. The orders may be covered by an insurance contract for the shipment of the orders, or may be shipped directly, without insurance, as indicated in the third column. The total number of orders received and the associated number of line items are shown in the fourth and fifth columns, respectively.

In a particular embodiment, the information provided by integrated management dashboard module 259 is sent via an electronic mail message to a group of users of supply chain system 200 who request to receive the electronic mail message. In another embodiment, the information is available via a graphical user interface that provides a customizable look and feel for the information presented. For example, the information can be provided via a web-based interface, and one or more items in Table 1 can provide links to further information related to the item. Thus, clicking the "Orders" box for the "Returns" orders received on "7/11/10" can provide a further presentation of information on the 158 return orders received by ERP database. Likewise, the further information presented on the 158 return orders can be clicked through to present information on the individual return orders, including the line items, quantities, and other information related to the individual return orders. Note that integrated management dashboard system 259 can provide information related to the other steps in the order fulfillment method described below, and that the information can be sent via electronic mail, graphical user interface, web-based interface, another interface, or a combination thereof for each of the other steps in the method.

The orders received in block 310 are validated in block 312. For example, ERP database 240 can verify that the line items exist in the supply chain system 200, that the ordered quantities of each line item are currently available, and that the prices for each line item are correct. The order validation in block 312 is associated with an SLA calling for 100% order validation in real time, that is, as orders are received. The notification procedures include no routine notices. For example, the number of orders received and successfully validated may be so high as to make any routine notification of successful validation unnecessary or undesirable. However, an immediate alert can be generated when an order or a portion of an order is not successfully validated. Integrated management dashboard module 259 provides for users of supply chain system 200 to receive the validation failure notices generated in block 312. In a particular embodiment, a notice of a failed validation can first go to the source of the order that failed. In this way, a first check for accurate order entry is achieved. If the order is returned and still fails validation, then a notice of the failure can next go to a troubleshooting process where the cause of the failure is determined.

TABLE 1

Orders received in ERP Database

| Order Date | Channel | Order Type | Orders | Line Items |
|---|---|---|---|---|
| Jul. 11, 2010 | Retail Outlets | Insured | 1523 | 6389 |
| Jul. 11, 2010 | Internet Sales | Direct | 742 | 1477 |
| Jul. 11, 2010 | Internet Sales | Insured | 277 | 493 |
| Jul. 11, 2010 | Returns | Insured | 158 | 178 |
| Jul. 10, 2010 | Retail Outlets | Insured | 2245 | 8750 |
| Jul. 10, 2010 | Internet Sales | Direct | 687 | 1296 |
| Jul. 10, 2010 | Internet Sales | Insured | 315 | 612 |
| Jul. 10, 2010 | Returns | Insured | 144 | 157 |

TABLE 2

Validation Failures

| Order Date | Channel | Order Type | Line Items | Failing Line Items | Status | Failure Mode |
|---|---|---|---|---|---|---|
| Jul. 11, 2010 | Store #1683 | Insured | 11 | 2 | Open | Unknown |
| Jul. 11, 2010 | Internet Portal | Insured | 1 | 1 | Resolved | Entry Error |

Table 2 illustrates an example of a validation failure alert provided by integrated management dashboard module 259 for the validation failures in block 312. The date for each order is provided in the first column. The second column shows the channel associated with the failed orders. In a particular embodiment, integrated management dashboard module 259 tracks the source channel for validation failures in order to detect trends in the sources for validation failures. For example, if a particular channel or class of channels is persistently a source of validation failures, a troubleshooting process can look for a common problem, and thus improve validation statistics. The fifth column indicates the number of line items in the failing order that have problems. In a particular embodiment, the information in Table 2 includes links to further information related to the selected field. For example, clicking the "Failing Line Items" box for the "Internet Portal" orders can provide a further presentation of information on the failing order, including the item that was ordered. The sixth column shows a status for each validation failure, and the seventh column shows a failure mode for each validation failure. A non-limiting example of a failure mode includes an order entry error, specifying an obsolete line item, ordering an invalid quantity for a product, specifying a wrong price for a line item, another error, or a combination thereof.

The orders validated in block 312 are processed to a warehouse management system (WMS) in block 314. For example, ERP database 240 can provide a ship order to distribution centers 224 to ship the line items included in the order to retail customer 212. The order processing to the WMS in block 310 is associated with an SLA calling for 75% of the validated orders to be processed to the WMS within 1 hour of validation, and for 100% of the validated orders to be processed to the WMS within 2 hours of validation. The associated notification procedures include periodic routine notices. For example, when all SLAs are being met, a daily summary of the orders processed to the WMS can be sufficient to monitor the activity. Another time period for receipt of the summary can be chosen as needed or desired. However, an immediate alert can be generated when order processing to the WMS is not meeting the SLAs. Integrated management dashboard module 259 provides for users of supply chain system 200 to receive the routine notices and the alerts generated in block 314.

Table 3 illustrates an example of a routine notice provided by integrated management dashboard module 259 for the order processing in block 314. The third column shows the orders that are expected to be processed to the WMS. For example, the expected "Insured" orders include the total of the insured orders for the order date from Table 1, 1959 orders, less the orders that failed the validation step in block 312, 2 orders, for a total of 1597 expected insured orders to be processed. The expected insured orders and the expected direct orders are each split into four rows as follows. The first row shows the actual orders that were processed within the 1-hour SLA in the fourth column, and the associated percent of the expected orders that were processed within the 1-hour SLA in the fifth column.

TABLE 3

Orders Processed to Warehouse Management System

| Order Date | Order Type | Expected Orders | Actual Orders | Percent | Status | Alert |
|---|---|---|---|---|---|---|
| Jul. 11, 2010 | Insured | 1957 | 1507 | 77 | P1 | N |
| | | | 450 | 33 | P2 | N |
| | | | 0 | 0 | P+ | N |
| | | | 0 | 0 | UP | N |

TABLE 3-continued

Orders Processed to Warehouse Management System

| Order Date | Order Type | Expected Orders | Actual Orders | Percent | Status | Alert |
|---|---|---|---|---|---|---|
| Jul. 11, 2010 | Direct | 742 | 534 | 72 | P1 | Y |
| | | | 199 | 27 | P2 | Y |
| | | | 0 | 0 | P+ | N |
| | | | 9 | 1 | UP | Y |

The sixth column indicates the status that the row relates to. Thus in the first row, the 1-hour SLA performance status is indicated as "P1." The seventh column indicates if the row has generated an alert. Here, since 77% of the expected insured orders are actually processed to the WMS within one hour, integrated management dashboard system 259 does not generate an alert for the 1-hour SLA for the insured orders. However, since 72% of the expected direct orders are actually processed to the WMS within one hour, integrated management dashboard system 259 generates an alert for the 1-hour SLA for the direct orders. The second row shows the actual orders that were processed within the 2-hour SLA, the associated percentage, and the alert status. The 2-hour SLA performance status is indicated as "P2." The third row shows the actual orders that were processed that missed the 2-hour SLA, the associated percentage, and the alert status. The missed 2-hour SLA performance status is indicated as "P2+." The fourth row shows the actual orders that have not been processed or that have an unknown status, the associated percentage, and the alert status. The unknown status is indicated as "UP." In a particular embodiment, the information in Table 3 includes links to further information related to the selected field. For example, clicking the "Actual Orders" entry for the unknown direct orders can provide additional information on the unknown orders.

In a particular embodiment, an alert notice is generated for each alert condition. For example, alert notices can be provided for failing to meet the 75% SLA and the 100% SLA for direct order, and for failing to process the 9 direct orders. The alert notices can include similar information to as the routine notice, and can include additional information that can be used by a troubleshooting system to determine the cause of the unprocessed orders and the failure to meet the SLAs.

The orders processed to the WMS in block 314 are acknowledged by the WMS and the availability of the inventory is verified in block 316. For example, distribution centers 224 can include manual or automated inventory control systems to determine if the ordered quantity of a particular item is available at the selected distribution center, and after verifying the order, can send an order acknowledgement back to ERP database 240. The order acknowledgement in block 316 is associated with an SLA calling for 75% of the orders to be acknowledged by the WMS within 1 hour of receipt, and for 100% of the validated orders to be acknowledged by the WMS within 4 hours of receipt. The associated notification procedures include periodic routine notices, and immediate alerts when order acknowledgment from the WMS is not meeting the SLAs. Integrated management dashboard module 259 provides for users of supply chain system 200 to receive the routine notices and the alerts generated in block 316.

TABLE 4

Orders Acknowledged by Warehouse Management System

| Order Date | Order Type | Expected Orders | Actual Orders | Percent | Status | Alert |
|---|---|---|---|---|---|---|
| Jul. 11, 2010 | Direct | 734 | 581 | 79 | A1 | N |
| | | | 112 | 15 | A4 | Y |
| | | | 0 | 0 | A+ | N |
| | | | 8 | 1 | UA-E | Y |
| | | | 33 | 5 | UA-I | Y |

Table 4 illustrates an example of a routine notice provided by integrated management dashboard module 259 for the order acknowledgement in block 316. The third column shows the orders that are expected to be acknowledged by the WMS. For example, the expected "Direct" orders include the total of the processed direct orders for the order date from Table 1, 742 orders, less the orders that were unprocessed in the processing step in block 314, 9 orders, for a total of 734 expected direct orders to be acknowledged.

The expected direct orders are each split into five rows as follows. The first row shows the actual orders that were acknowledged within the 1-hour SLA in the fourth column, and the associated percent of the expected orders that were acknowledge within the 1-hour SLA in the fifth column. The sixth column indicates the status that the row relates to. Thus in the first row, the 1-hour SLA performance status is indicated as "A1." The seventh column indicates if the row has generated an alert. Here, since 79% of the expected insured orders are actually acknowledged by the WMS within one hour, integrated management dashboard system 259 does not generate an alert for the 1-hour SLA. The second row shows the actual orders that were acknowledged within the 4-hour SLA, the associated percentage, and the alert status. The 4-hour SLA performance status is indicated as "A4." Here, since only 15% of the expected direct orders are actually acknowledged by the WMS within four hours, integrated management dashboard system 259 generates an alert for the 4-hour SLA for the direct orders. In another embodiment, since the remaining orders were unacknowledged, as described below, no alert is given for missing the 4-hour SLA, because all of the acknowledged orders were acknowledged within the 4-hour SLA. The third row shows the actual orders that were acknowledged that missed the 4-hour SLA, the associated percentage, and the alert status. The missed 4-hour SLA performance status is indicated as "A4+." The actual orders that were unacknowledged due to errors in the orders or for unknown reasons are shown in the fourth row and the actual orders that were unacknowledged due to lack of inventory are shown in the fifth row. The unknown/error status is indicated as "UA-E," and the lack of inventory status is indicated as "UA-I." In a particular embodiment, the information in Table 4 includes links to further information related to the selected field. In a particular embodiment, an alert notice is generated for each alert condition.

The orders acknowledged by the WMS in block 316 are shipped by the WMS in block 318. For example, distribution centers 224 can package the ordered items and provide the packages to delivery services 226 for shipment to the customer. The shipment in block 318 is associated with an SLA calling for 100% of the acknowledged orders to be shipped within 24 hours of the receipt of the order. The associated notification procedures include periodic routine notices, and immediate alerts when order shipment is not meeting the SLA. Integrated management dashboard module 259 provides for users of supply chain system 200 to receive the routine notices and the alerts generated in block 318.

Table 5 illustrates an example of a routine notice provided by integrated management dashboard module 259 for the order shipments in block 318. The third column shows the orders that are expected to be shipped by the WMS. For example, the expected "Direct" orders include the total of the processed direct orders for the order date from Table 1, 742 orders, less the orders that were unprocessed in Table 3, 9 orders, less the orders that were unacknowledged in Table 4, 41 orders, for a total of 693 expected direct orders to be shipped. The expected direct orders are each split into six rows, similarly to Tables 3 and 4. Here, however, the first and second rows show the actual orders that were shipped within 12 hours and within 18 hours, respectively. No alerts are generated for these rows, and the information provided is for tracking purposes rather than for performance to the SLA. Thus 12-hour and 18-hour tracking statuses are indicated as "S12" and "S18," respectively. The third and fourth rows show the performance to the 24-hour SLA, as indicated by the "S24" and S24+" statuses, respectively. The actual orders that were unshipped due to errors in the orders or for unknown reasons are shown in the fifth row and the actual orders that were unshipped due to lack of inventory are shown in the sixth row. The unknown/error status is indicated as "US-E," and the lack of inventory status is indicated as "US-I." In a particular embodiment, the information in Table 5 includes links to further information related to the selected field. In a particular embodiment, an alert notice is generated for each alert condition.

TABLE 5

Orders Shipped by Warehouse Management System

| Order Date | Order Type | Expected Orders | Actual Orders | Percent | Status | Alert |
|---|---|---|---|---|---|---|
| Jul. 11, 2010 | Direct | 693 | 381 | 55 | S12 | N/A |
| | | | 187 | 27 | S18 | N/A |
| | | | 122 | 18 | S24 | N |
| | | | 0 | 0 | S24+ | N |
| | | | 1 | <1 | US-U | Y |
| | | | 2 | <1 | US-I | Y |

The orders shipped by the WMS in block 318 are invoiced in block 320. For example, account management 236 can receive information on the orders as they are shipped, and can provide invoices to the customers. The invoicing in block 32016 is associated with an SLA calling for 75% of the shipped orders to be invoiced within 12 hours of shipment, and for 100% of the shipped orders to be invoiced within 24 hours of shipment. The associated notification procedures include periodic routine notices, and immediate alerts when order invoicing is not meeting the SLAs. Integrated management dashboard module 259 provides for users of supply chain system 200 to receive the routine notices and the alerts generated in block 320.

TABLE 6

Orders Invoiced

| Order Date | Order Type | Expected Invoices | Actual Orders | Percent | Status | Alert |
|---|---|---|---|---|---|---|
| Jul. 11, 2010 | Direct | 690 | 538 | 78 | I12 | N |
| | | | 150 | 22 | I24 | N |
| | | | 1 | <1 | I24+ | Y |
| | | | 0 | 0 | UI-U | N |
| | | | 1 | <1 | UI-E | Y |

Table 6 illustrates an example of a routine notice provided by integrated management dashboard module 259 for the order invoicing in block 320. The third column shows the orders that are expected to be invoiced. For example, the expected "Direct" orders include the total of the processed direct orders for the order date from Table 1, 742 orders, less the orders that were unprocessed in Table 3, 9 orders, less the orders that were unacknowledged in Table 4, 41 orders, less the orders that were not shipped in Table 5, 3 orders, for a total of 690 expected direct orders to be invoiced. The expected direct orders are each split into five rows, similarly to Table 4. Here the 12-hour SLA performance status is indicated as "I12," the 24-hour SLA performance status is indicated as "I24," and the missed 24-hour SLA status is indicated as "I24+." The actual orders that were un-invoiced due to for unknown reasons are shown in the fourth row, and the actual orders that were un-invoiced due to errors in the order are shown in the fifth row. The unknown status is indicated as "UI-U," and the error status is indicated as "UI-I." In a particular embodiment, the information in Table 6 includes links to further information related to the selected field. In a particular embodiment, an alert notice is generated for each alert condition.

In a particular embodiment, when integrated management dashboard module 259 tracks interactions within supply chain system 200 to determine the success or failure of the interactions to meet various SLAs, the integrated management dashboard module also tracks the interactions in real time, to detect trends in the performance to the various SLAs. In particular, if a set of interactions are historically performed at a success rate that is better than the SLA level, then a decline in the success rate is also detected. For example, if the typical performance for the order acknowledgement by the WMS is that 78-85% of orders are acknowledged within one hour of processing, but the recent performance has trended downward toward 75% then integrated management dashboard module 259 can detect the decrease in performance. Integrated management dashboard module 259 can then provide an alert based upon performance that meets the SLA level, but is declining. The alert can then be provided to a troubleshooting process to determine a root cause for the decrease in performance to the SLA, so that changes or repairs can be implemented before the success rate drops below the SLA level.

In another embodiment, integrated management dashboard module 259 tracks interactions within supply chain system 200 to determine if a different set of interactions can be performed to improve the performance to the various SLAs. In particular, if an element in supply chain system 200 is capable of performing the same or similar interactions as an element that is failing to meet the SLA level, then integrated management dashboard module 259 will assign some or all of the interactions that would normally fall to the failing element to the alternate element until the failing element's performance can be improved. For example, if there are two invoicing systems, one for direct orders, and another for insured orders, and if the invoicing system for the direct orders is slowing down to such that only 60% of the shipped orders are being invoiced within 12 hours of shipment, then integrated management dashboard module 259 can reassign a portion of the direct order invoicing to the insured order invoicing channel. Integrated management dashboard module 259 can then provide an alert that interactions in supply chain system 200 have been rerouted and a troubleshooting process can determine a root cause for the decreased performance in the direct order channel.

In another embodiment, integrated management dashboard module 259 tracks interactions within supply chain system 200 to determine if a particular order or line item is incorrectly processed. In particular, if an order is processed through some step more than once, or if spurious interactions occur, then integrated management dashboard module 259 will detect the problem and initiate interactions to correct the problem. For example, if an order is cancelled, but before the cancellation is processed, the order is shipped, integrated dashboard module 259 can initiate a product return process to get the inventor back.

Figure 14:
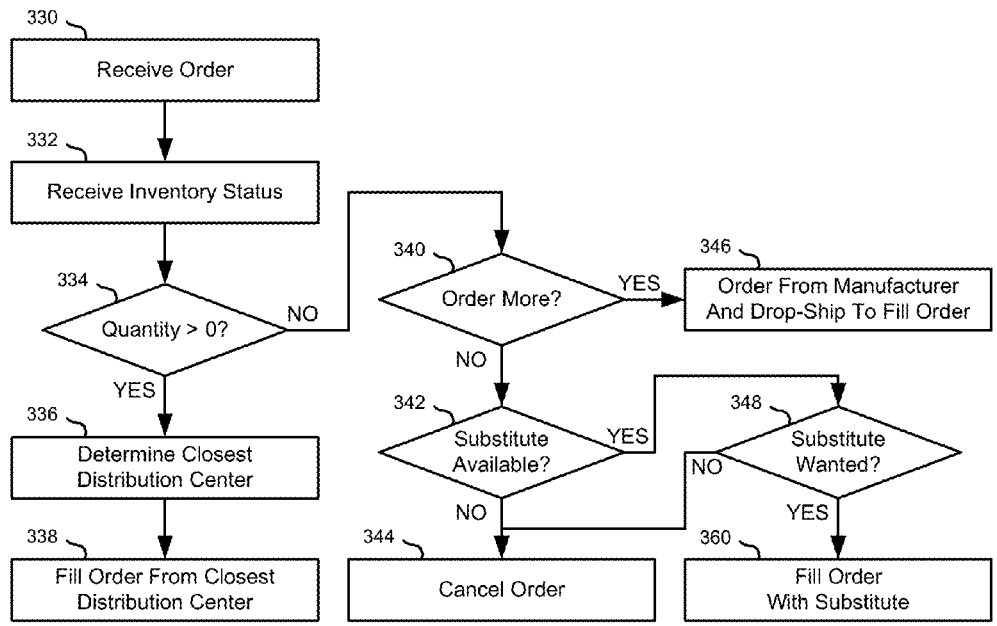
FIG. 14 is a flowchart illustrating an embodiment of a method of vendor and customer management in the supply chain of FIG. 2.

FIG. 14 is a flowchart illustrating an embodiment of a method for customer and vendor management in a supply chain system. The method starts in block 330 where an order is received. For example, retail customer 212 can order a mobile device from a channel in supply chain system 200. The order can be received by ERP database 240 and forwarded to ordering module 254. An inventory status is received in block 332. For example a quantity of mobile devices that are available in distribution center 224 can be received by ERP database 240 and forwarded to ordering module 254. A decision is made as to whether or not the quantity of devices in inventory is greater than zero in decision block 334. If the quantity of devices in inventory is greater than zero, the "YES" branch of decision block 334 is taken, the distribution center that is closest to the location of the order is determined in block 336, and the order is filled from the closest distribution center in block 338.

If the quantity of devices in inventory is zero, the "NO" branch of decision block 334 is taken, and a decision is made as to whether or not to order an additional quantity of the devices in decision block 340. If so, the "YES" branch of decision block 340 is taken, and an order is placed with the manufacturer or supplier of the device, and the device is drop-shipped to the customer to fill the order in block 346. If an additional quantity of devices is not to be ordered, the "NO" branch of decision block 340 is take, and a decision is made as to whether or not a substitute device is available in decision block 342. If not, the "NO" branch of decision block 342 is taken, and the order is cancelled in block 344. If a substitute device is available, the "YES" branch of decision block 342 is taken, and a decision is made as to whether or not the substitute is wanted in decision block 348. For example, the customer may be satisfied with the substitution, or may wish to cancel the order. If the substitute is not wanted, the "NO" branch of decision block 348 is taken, and the order is cancelled in block 344. If a substitute device is wanted, the "YES" branch of decision block 348 is taken, and the order is filled with the substitute device in block 360.

Figure 15:
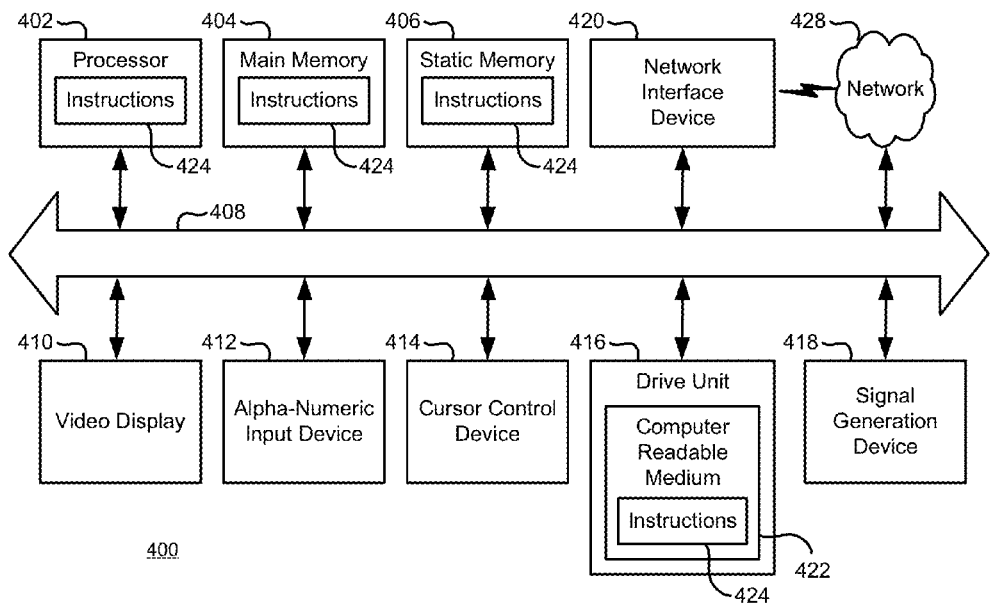
FIG. 15 is a block diagram illustrating an embodiment of a general computer system.

FIG. 15 shows an illustrative embodiment of a general computer system 400 in accordance with at least one embodiment of the present disclosure. Computer system 400 includes a set of instructions that can be executed to cause computer system 400 to perform any one or more of the methods or computer based functions disclosed herein. Computer system 400 can operate as a standalone device or can be connected via a network to other computer systems or peripheral devices.

In a networked deployment, computer system 400 operates in the capacity of a server or as a client computer in a server-client network environment, or as a peer computer system in a peer-to-peer (or distributed) network environment. Computer system 400 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 400 is implemented using electronic devices that provide voice, video or data communication. Further, while computer system 400 is illustrated as a single system, the term "system" shall also be taken to include any collection of systems or sub-systems that individually or jointly execute a set, or multiple sets, of instructions to perform one or more computer functions.

Computer system 400 includes a processor 402 such as a central processing unit (CPU), a graphics processing unit (GPU), or both. Moreover, computer system 400 includes a main memory 404 and a static memory 406 that communicate with each other via a bus 408. Computer system 400 further includes a video display unit 410, such as a liquid crystal display (LCD), an organic light emitting diode (OLED), a flat panel display, a solid state display, or a cathode ray tube (CRT). Additionally, computer system 400 includes an input device 412, such as a keyboard, and a cursor control device 414, such as a mouse. Computer system 400 also includes a disk drive unit 416, a signal generation device 418, such as a speaker or remote control, and a network interface device 420.

In a particular embodiment, disk drive unit 416 includes a computer-readable medium 422 in which one or more sets of instructions 424 are embedded. Instructions 424 embody one or more of the methods or logic as described herein. In a particular embodiment, instructions 424 reside completely, or at least partially, within main memory 404, static memory 406, and/or within processor 402 during execution by computer system 400. Main memory 404 and processor 402 also include computer-readable media. Network interface device 420 provides connectivity to a network 426 such as a wide area network (WAN), a local area network (LAN), or other network. The present disclosure contemplates a computer-readable medium that includes instructions 424 or receives and executes instructions 424 responsive to a propagated signal, so that a device connected to network 426 can communicate voice, video or data over network 426. Further, instructions 424 can be transmitted or received by network 426 via network interface device 420.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of managing a supply chain, the method comprising:
    providing a plurality of order fulfillment options to a customer, the plurality of order fulfillment options comprising a fill-partial order fulfillment option;
    receiving, from the customer, a selection of a particular order fulfillment option from among the plurality of order fulfillment options;
    receiving a first order from the customer, the first order being for a first product and for a second product;
    receiving, at an ordering module, a first inventory status from a first distribution center, the first inventory status including:
        a first quantity of the first product that is available at the first distribution center; and
        a second quantity of the second product that is available at the first distribution center, wherein receiving the first inventory status is in response to receiving the first order;
    determining, at the ordering module, that the second quantity is equal to zero;
    directing, from the ordering module, that the first distribution center send the first product to the customer in response to determining that the particular order fulfillment option comprises the fill-partial order fulfillment option;
    determining, at a tracking module, a first time when the first distribution center is directed to send the first product to the customer;
    determining, at the tracking module, a second time when the first distribution center sent the first product to the customer;
    calculating, by utilizing instructions from a non-transitory memory that are executed by a processor that executes the tracking module, that a duration between the first time and the second time is greater than a predetermined duration specified in a service level agreement;
    generating a first alert when the duration between the first time and the second time is determined to be greater than the predetermined duration specified in the service level agreement, wherein the first alert indicates a failure of the supply chain in satisfying the service level agreement;
    generating a second alert when a percentage of the first order is not acknowledged within a time period and in accordance with an acknowledgement service level in the service level agreement;
    determining, based on an alert selected from the group comprising the first alert and the second alert, a portion of the supply chain that caused the failure; and
    adjusting the portion of the supply chain to rectify the failure.

2. The method of claim 1, wherein:
    the first product comprises a first subscriber identity module associated with the customer;
    the method further comprising:
        receiving a first authorization request from a first device, the first authorization request purporting to be from the customer;
        determining that the first device includes the subscriber identity module; and
        activating an account associated with the customer on based the determination that the first device includes the subscriber identity module.

3. The method of claim 2, further comprising:
    receiving a second authorization request from a second device, the second authorization request purporting to be from the customer;
    determining that the second device does not include the subscriber identity module; and
    deactivating the account associated based on the determination that the second device does not include the subscriber identity module.

4. The method of claim 3, further comprising notifying the customer of an unauthorized authorization request to access the account in response to deactivating the account.

5. The method of claim 4, further comprising:
    determining that the second authorization request was fraudulent; and
    notifying an enforcement authority of the fraudulent second authorization request.

6. The method of claim 1, wherein the plurality of order fulfillment options further comprises a delay-and-fill-complete order fulfillment option, the method further comprising, in response to determining that the particular order fulfillment option comprises the delay-and-fill order fulfillment option:
    receiving, at the ordering module, a second inventory status from the first distribution center, the second inventory status being received after the first inventory status, and the first inventory status including a third quantity of the second product that is available at the first distribution center;
    determining, at the ordering module, that the third quantity is not equal to zero; and
    directing from the ordering module that the first distribution center sends the first product and the second product to the customer.

7. The method of claim 6, wherein the plurality of order fulfillment options further comprises a kill order fulfillment option, the method further comprising killing the first order in the ordering module in response to determining that the particular order fulfillment option comprises the kill order fulfillment option.

8. The method of claim 7, wherein the plurality of order fulfillment options further comprises a substitute-and-fill order fulfillment option, the method further comprising, in response to determining that the particular order fulfillment option comprises the substitute-and-fill order fulfillment option:
    determining at the ordering module that a third product is substitutable for the second product;
    receiving at the ordering module a second inventory status from the first distribution center, the second inventory status including a third quantity of the third product that is available at the first distribution center, wherein receiving the second inventory status at the ordering module is in response to determining that the third product is substitutable for the second product; and
    directing the first distribution center to send the first product and the third product to the customer.

9. The method of claim 8, wherein the plurality of order fulfillment options further comprises an update-and-fill order fulfillment option, the method further comprising, in response to determining that the particular order fulfillment option comprises the update-and-fill order fulfillment option:
    determining, at the ordering module, that a third product is a newer product than the second product, and that the third product is substitutable for the second product;

notifying the customer of the availability of the third product as a substitute for the second product;

receiving an updated first order from the customer, the updated first order being for the first product and for the third product; and directing, from the ordering module, that the first distribution center sends the first product and the third product to the customer.

10. The method of claim 1, further comprising:

receiving at the ordering module a second inventory status from a second distribution center, the second inventory status including a third quantity of the first product that is available at the second distribution center;

receiving at a planning module the first inventory status and the second inventory status; determining at the planning module that a sum of the first quantity of the first product and the third quantity of the first product is less than a predetermined quantity; and generating at the planning module a second order for a fourth quantity of the first product in response to determining that the sum of the first quantity and the third quantity is less than the predetermined quantity.

11. A non-transitory computer readable device comprising instructions, which when loaded and executed by a processor, cause the processor to perform operations, the operations comprising:

providing a plurality of order fulfillment options to a customer, the plurality of order fulfillment options comprising a fill-partial order fulfillment option;

receiving, from the customer, a selection of a particular order fulfillment option from among the plurality of order fulfillment options;

receiving a first order from the customer, the first order being for a first product and for a second product;

receiving, at an ordering module, a first inventory status from a first distribution center, the first inventory status including:

a first quantity of the first product that is available at the first distribution center; and a second quantity of the second product that is available at the first distribution center, wherein receiving the first inventory status is in response to receiving the first order;

determining, at the ordering module, that the second quantity is equal to zero;

directing from the ordering module that the first distribution center send the first product to the customer in response to determining that the particular order fulfillment option comprises the fill-partial order fulfillment option;

determining, at a tracking module, a first time when the first distribution center is directed to send the first product to the customer;

determining, at the tracking module, a second time when the first distribution center sent the first product to the customer;

calculating, at the tracking module, that a duration between the first time and the second time is greater than a predetermined duration specified in a service level agreement;

generating a first alert when the duration between the first time and the second time is determined to be greater than the predetermined duration specified in the service level agreement, wherein the first alert indicates a failure of the supply chain in satisfying the service level agreement;

generating a second alert when a percentage of the first order is not acknowledged within a time period and in accordance with an acknowledgement service level in the service level agreement;

determining, based on an alert selected from the group comprising the first alert and the second alert, a portion of the supply chain that caused the failure; and adjusting the portion of the supply chain to rectify the failure.

12. The non-transitory computer readable device of claim 11, wherein:

the first product comprises a first subscriber identity module associated with the customer; the method further comprising:

receiving a first authorization request from a first device, the first authorization request purporting to be from the customer;

determining that the first device includes the subscriber identity module; and activating an account associated with the customer based the determination that the first device includes the subscriber identity module.

13. The non-transitory computer readable device of claim 11, wherein the plurality of order fulfillment options further comprise a delay-and-fill-complete order fulfillment option the operations further comprising, in response to determining that the particular order fulfillment option comprises the delay-and-fill order fulfillment option:

receiving, at an ordering module, a second inventory status from the first distribution center, the second inventory status being received after the first inventory status, and the first inventory status including a third quantity of the second product that is available at the first distribution center;

determining, at the ordering module, that the third quantity is not equal to zero; and directing, from the ordering module, that the first distribution center sends the first product and the second product to the customer.

14. The non-transitory computer readable device of claim 11, wherein the plurality of order fulfillment options further comprises a kill order fulfillment option, the operations further comprising killing the first order in the ordering module in response to determining that the particular order fulfillment option comprises the kill order fulfillment option.

15. The non-transitory computer readable device of claim 11, wherein the plurality of order fulfillment options further comprises a substitute-and-fill order fulfillment option, the operations further comprising, in response to determining that the particular order fulfillment option comprises the substitute-and-fill order fulfillment option:

determining, at the ordering module, that a third product is substitutable for the second product;

receiving, at the ordering module, a second inventory status from the first distribution center, the second inventory status including a third quantity of the third product that is available at the first distribution center, wherein receiving the second inventory status at the ordering module is in response to determining that the third product is substitutable for the second product; and directing the first distribution center to send the first product and the third product to the customer.

16. The non-transitory computer readable device of claim 11, wherein the plurality of order fulfillment options further comprises an update-and-fill order fulfillment option, the operations further comprising, in response to determining that the particular order fulfillment option comprises the update-and-fill order fulfillment option:
- determining, at the ordering module, that a third product is a newer product than the second product, and that the third product is substitutable for the second product;
- notifying the customer of the availability of the third product as a substitute for the second product;
- receiving an updated first order from the customer, the updated first order being for the first product and for the third product; and
- directing, from the ordering module, that the first distribution center sends the first product and the third product to the customer.

17. The non-transitory computer-readable device of claim 11, the method further comprising:
- receiving at the ordering module a second inventory status from a second distribution center, the second inventory status including a third quantity of the first product that is available at the second distribution center;
- receiving at a planning module the first inventory status and the second inventory status;
- determining at the planning module that a sum of the first quantity of the first product and the third quantity of the first product is less than a predetermined quantity; and
- generating at the planning module a second order for a fourth quantity of the first product in response to determining that the sum of the first quantity and the third quantity is less than the predetermined quantity.

18. A system for managing a supplier and a customer in a supply chain comprising:
- a non-transitory memory that stores instructions; and
- a processor that executes the instructions to perform operations, the operations comprising:
  - providing a plurality of order fulfillment options to the customer, the plurality of order fulfillment options comprising a fill-partial order fulfillment option;
  - receiving a selection of a particular order fulfillment option from among the plurality of order fulfillment options; and
  - receiving an order from the customer, the order being for a first product and for a second product;
  - receiving an inventory status from a distribution center, the inventory status including:
    - a first quantity of the first product that is available at the distribution center; and
    - a second quantity of the second product that is available at the distribution center, wherein receiving the inventory status is in response to receiving the order;
  - determining that the second quantity is equal to zero;
  - directing that the distribution center send the first product to the customer in response to determining that the particular order fulfillment option comprises the fill-partial order fulfillment option;
  - determining a first time when the first distribution center is directed to send the first product to the customer;
  - determining a second time when the first distribution center sent the first product to the customer;
  - calculating that a duration between the first time and the second time is greater than a predetermined duration specified in a service level agreement;
  - generating a first alert when the duration between the first time and the second time is determined to be greater than the predetermined duration specified in a service level agreement, wherein the first alert indicates a failure of the supply chain in satisfying the service level agreement;
  - generating a second alert when a percentage of the first order is not acknowledged within a time period and in accordance with an acknowledgement service level in the service level agreement;
  - determining, based on an alert from the group comprising the first alert and the second alert, a portion of the supply chain that caused the failure; and
  - adjusting the portion of the supply chain to rectify the failure.

19. The system of claim 18, wherein:
the first product comprises a first subscriber identity module associated with the customer;
the system further comprising an authorization module operable to:
- receive an authorization request from a device, the authorization request purporting to be from the customer;
- determining that the device includes the subscriber identity module; and
- activating an account associated with the customer on based the determination that the device includes the subscriber identity module.

20. The system of claim 18, wherein:
the ordering module is further operable to receive a second inventory status from a second distribution center, the second inventory status including a third quantity of the first product that is available at the second distribution center; and
the planning module is further operable to: receive the first inventory status and the second inventory status;
- determine that a sum of the first quantity of the first product and the third quantity of the first product is less than a predetermined quantity; and
- generate a second order for a fourth quantity of the first product in response to determining that the sum of the first quantity and the third quantity is less than the predetermined quantity.

* * * * *